United States Patent
Xu et al.

(10) Patent No.: US 10,201,032 B2
(45) Date of Patent: Feb. 5, 2019

(54) METHOD AND APPARATUS FOR TRANSMITTING INFORMATION ON SERVING GATEWAY FOR SUPPORTING SMALL CELL MOBILITY IN WIRELESS COMMUNICATION SYSTEM

(71) Applicant: LG ELECTRONICS INC., Seoul (KR)

(72) Inventors: Jian Xu, Seoul (KR); Kyungmin Park, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/123,611

(22) PCT Filed: Mar. 19, 2015

(86) PCT No.: PCT/KR2015/002679
§ 371 (c)(1),
(2) Date: Sep. 2, 2016

(87) PCT Pub. No.: WO2015/142078
PCT Pub. Date: Sep. 25, 2015

(65) Prior Publication Data
US 2017/0079087 A1   Mar. 16, 2017

Related U.S. Application Data

(60) Provisional application No. 61/955,769, filed on Mar. 19, 2014, provisional application No. 62/052,474, filed on Sep. 19, 2014.

(51) Int. Cl.
*H04W 76/18* (2018.01)
*H04W 76/12* (2018.01)
(Continued)

(52) U.S. Cl.
CPC .......... *H04W 76/18* (2018.02); *H04W 36/08* (2013.01); *H04W 76/12* (2018.02); *H04W 36/28* (2013.01);
(Continued)

(58) Field of Classification Search
CPC ............ H04W 76/0271; H04W 36/08; H04W 76/022; H04W 88/16; H04W 84/045
See application file for complete search history.

(56) References Cited

U.S. PATENT DOCUMENTS

| | | | |
|---|---|---|---|
| 9,848,322 B2 * | 12/2017 | Zhang | ................... H04W 76/14 |
| 2013/0064158 A1 | 3/2013 | Sundell et al. | |
| 2016/0227459 A1 * | 8/2016 | Fujishiro | ............... H04W 16/32 |

OTHER PUBLICATIONS

Alcatel-Lucent et al., "Discussion on SeNB change procedure", R2-140745, 3GPP TSG RAN WG2 Meeting #85, Feb. 10-14, 2014, 3 pages total.
(Continued)

*Primary Examiner* — Nam T Huynh
(74) *Attorney, Agent, or Firm* — Birch, Stewart, Kolasch & Birch, LLP

(57) ABSTRACT

A method and apparatus for transmitting information on a serving gateway (S-GW) in a wireless communication system is provided. A mobility management entity (MME) or a small cell evolved NodeB (SeNB) which manages a small cell, transmits an indication to a macro eNB (MeNB), if the MeNB and the SeNB are connected to different S-GWs from each other.

12 Claims, 11 Drawing Sheets

(51) Int. Cl.
*H04W 36/08* (2009.01)
*H04W 36/28* (2009.01)
*H04W 76/15* (2018.01)
*H04W 84/04* (2009.01)
*H04W 88/16* (2009.01)

(52) U.S. Cl.
CPC .......... *H04W 76/15* (2018.02); *H04W 84/045* (2013.01); *H04W 88/16* (2013.01)

(56) References Cited

OTHER PUBLICATIONS

Broadcom Corporation, "MCG handover for dual connectivity", R2-140531, 3GPP TSG-RAN WG2 Meeting #85, Feb. 10-14, 2014, 8 pages total.
Ericsson, "SeNB release procedures", R2-140648, 3GPP TSG-RAN WG2 Meeting #85, Feb. 10-14, 2014, pp. 1-6.
NTT Docomo, Inc., "SeNB change procedure", R2-140541, 3GPP TSG-RAN WG2 Meeting #85, Feb. 10-14, 2014, 8 pages total.

* cited by examiner

[Fig. 1]
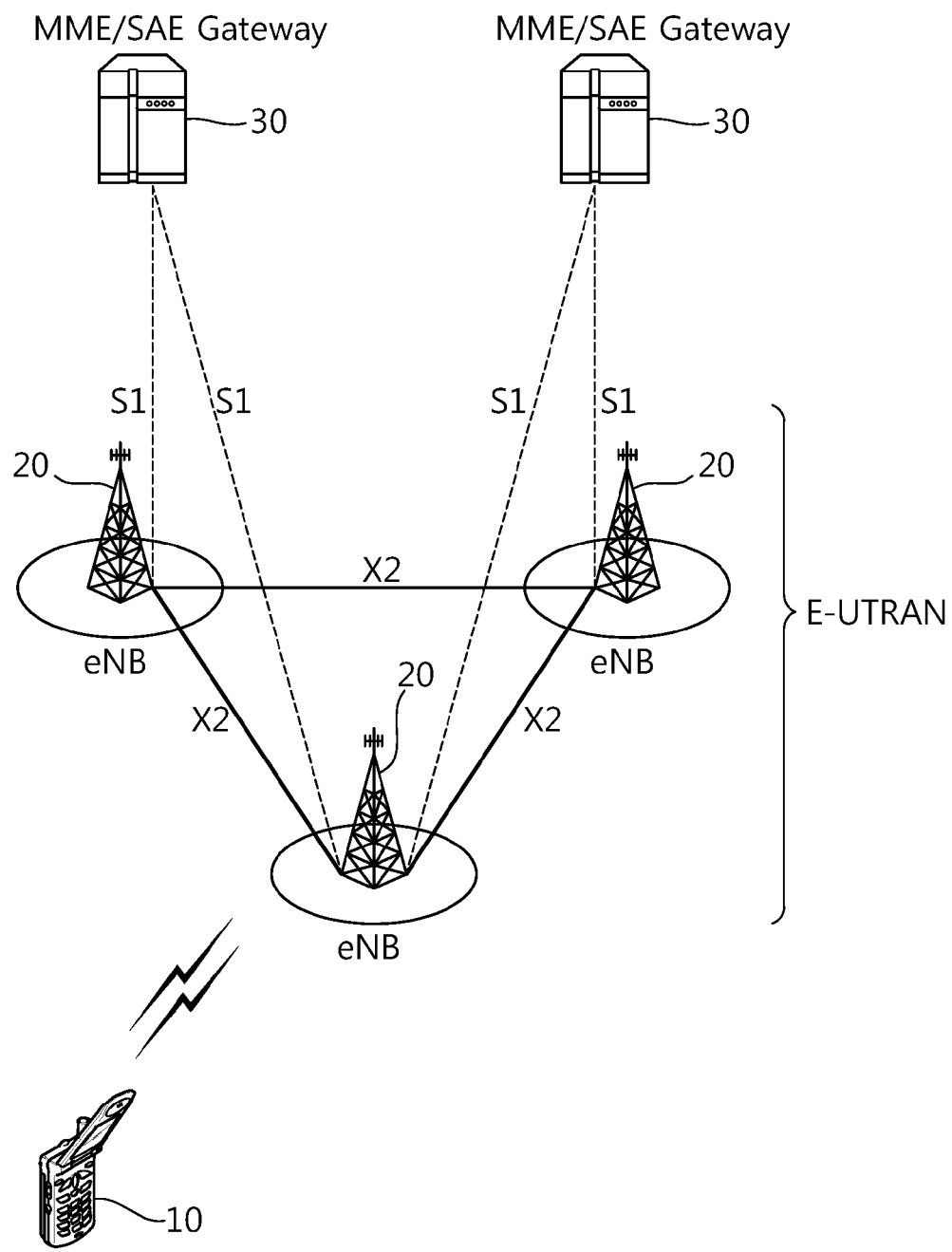

[Fig. 2]
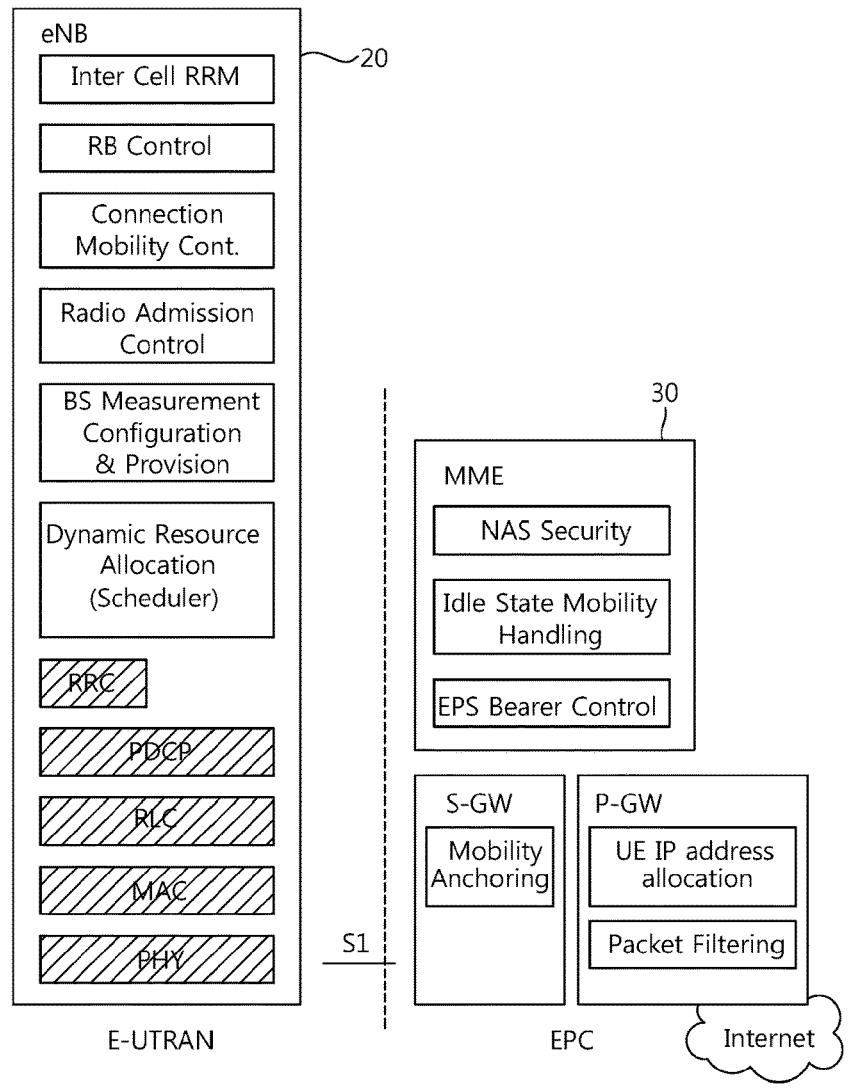
[Fig. 3]
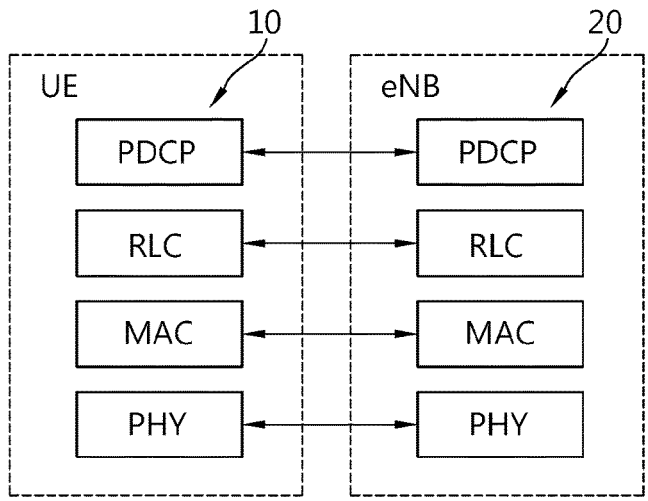

[Fig. 4]
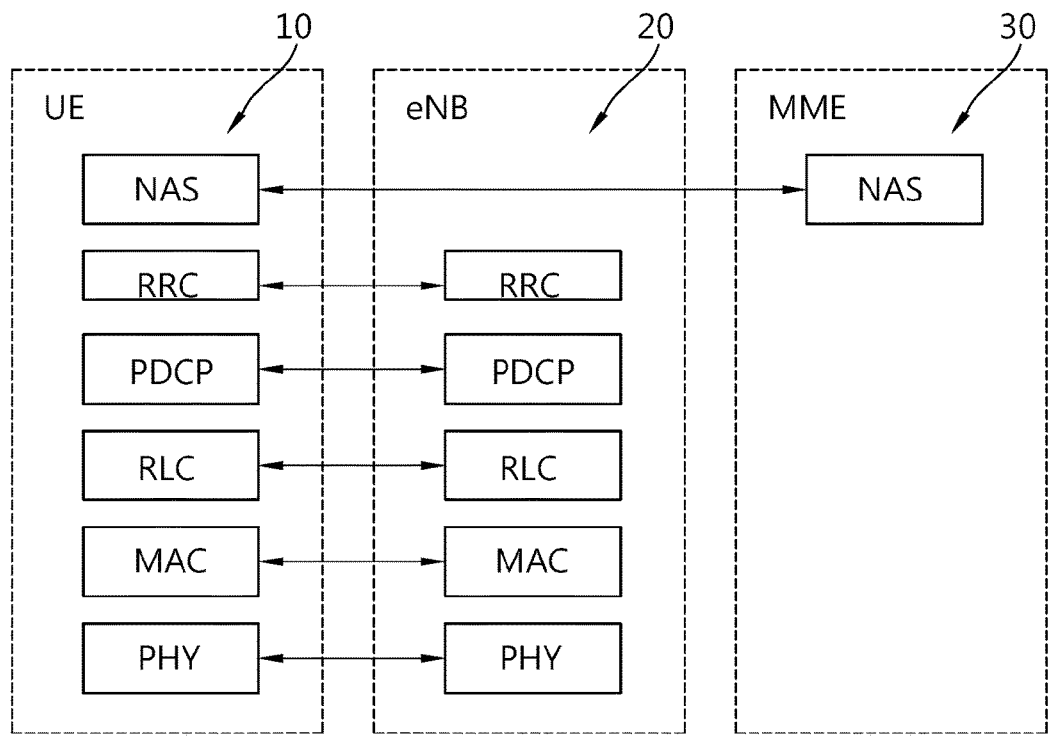
[Fig. 5]
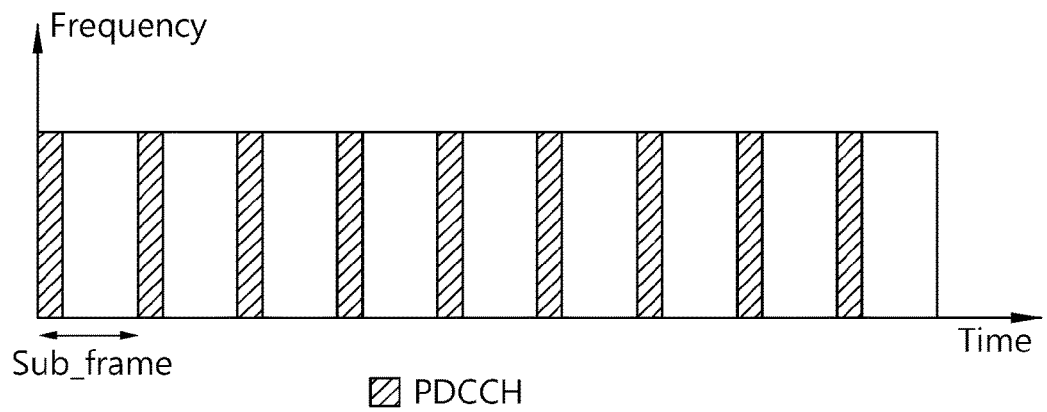

[Fig. 7]
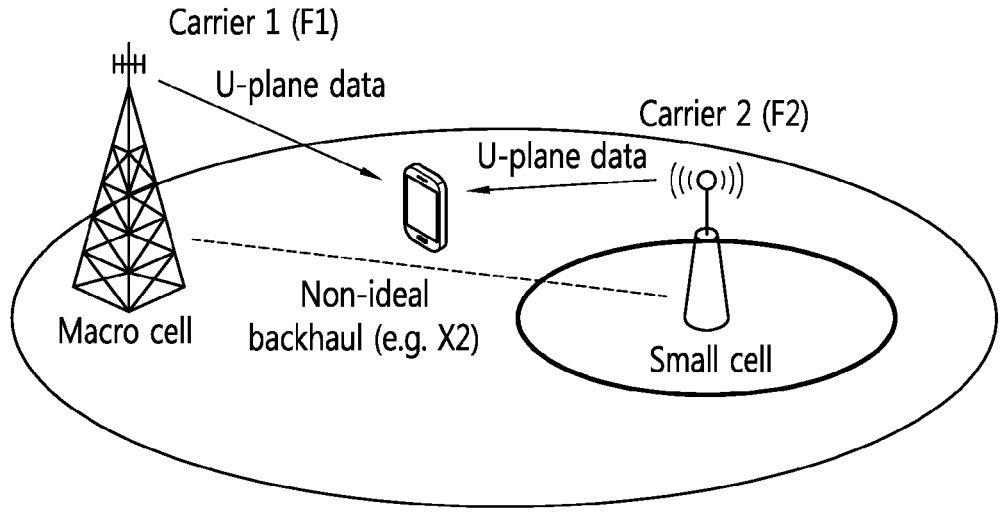
[Fig. 8]
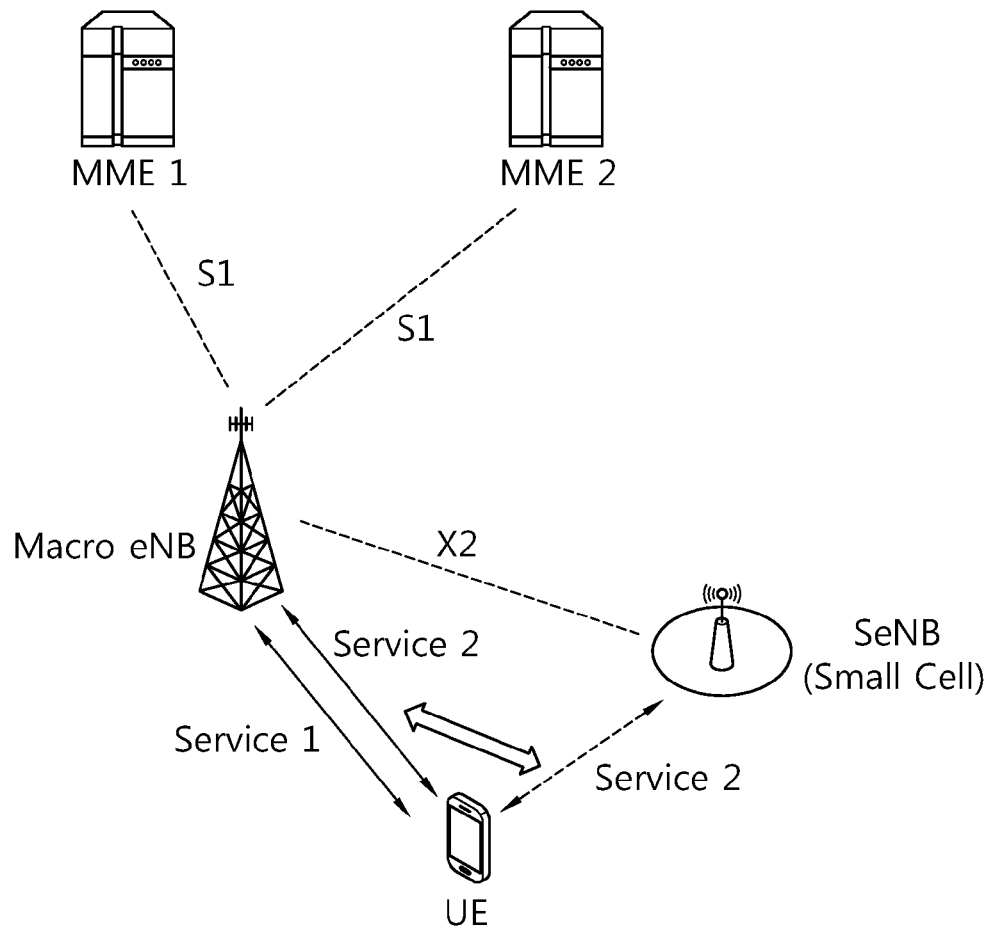

[Fig. 9]
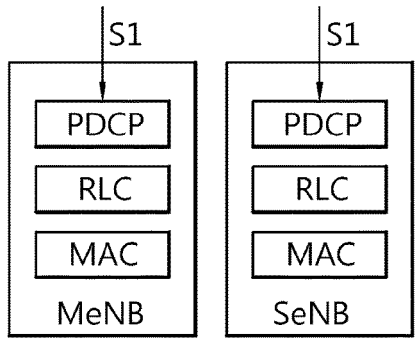
[Fig. 10]
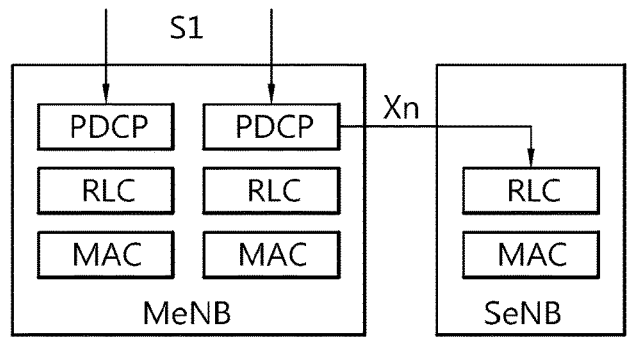
[Fig. 11]
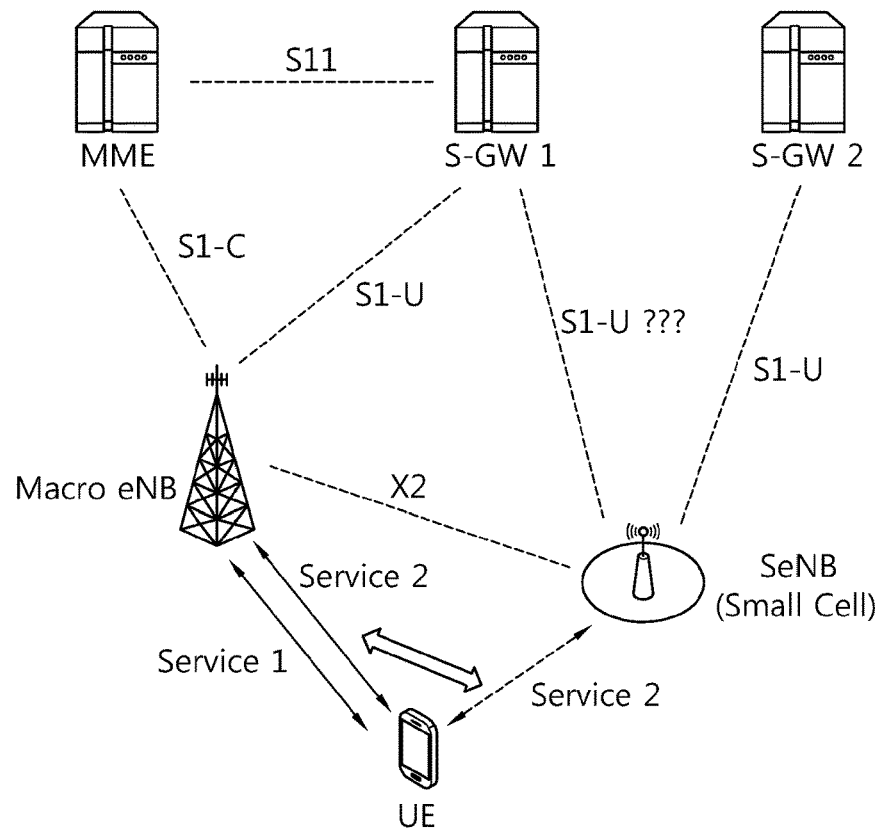

[Fig. 12]
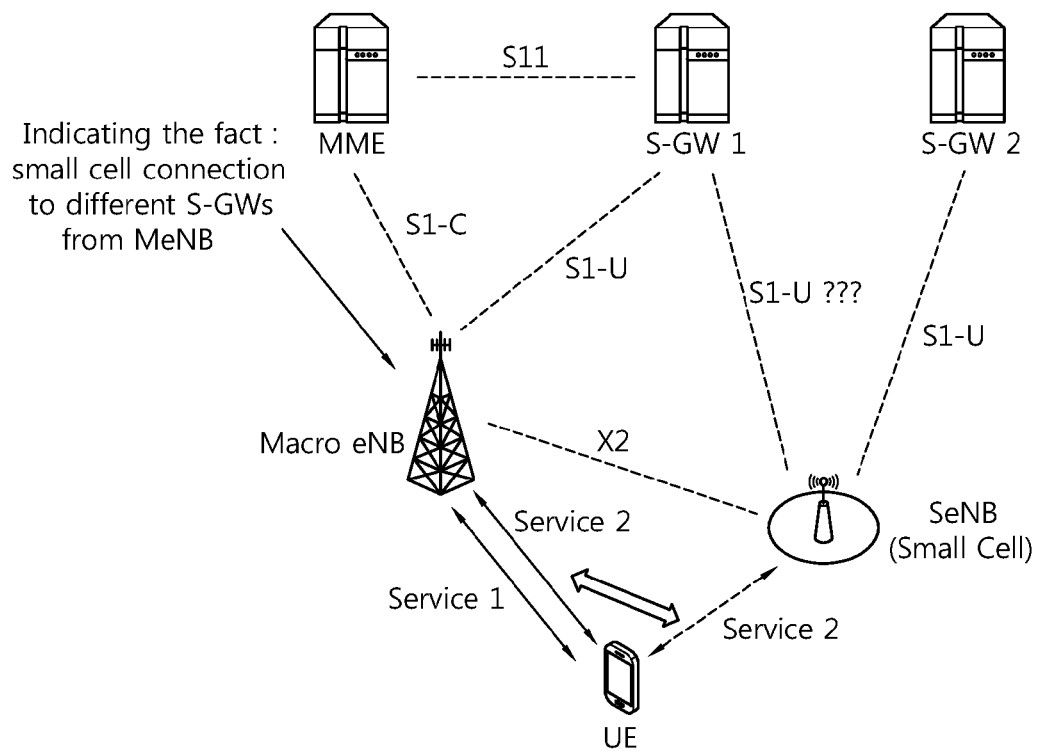

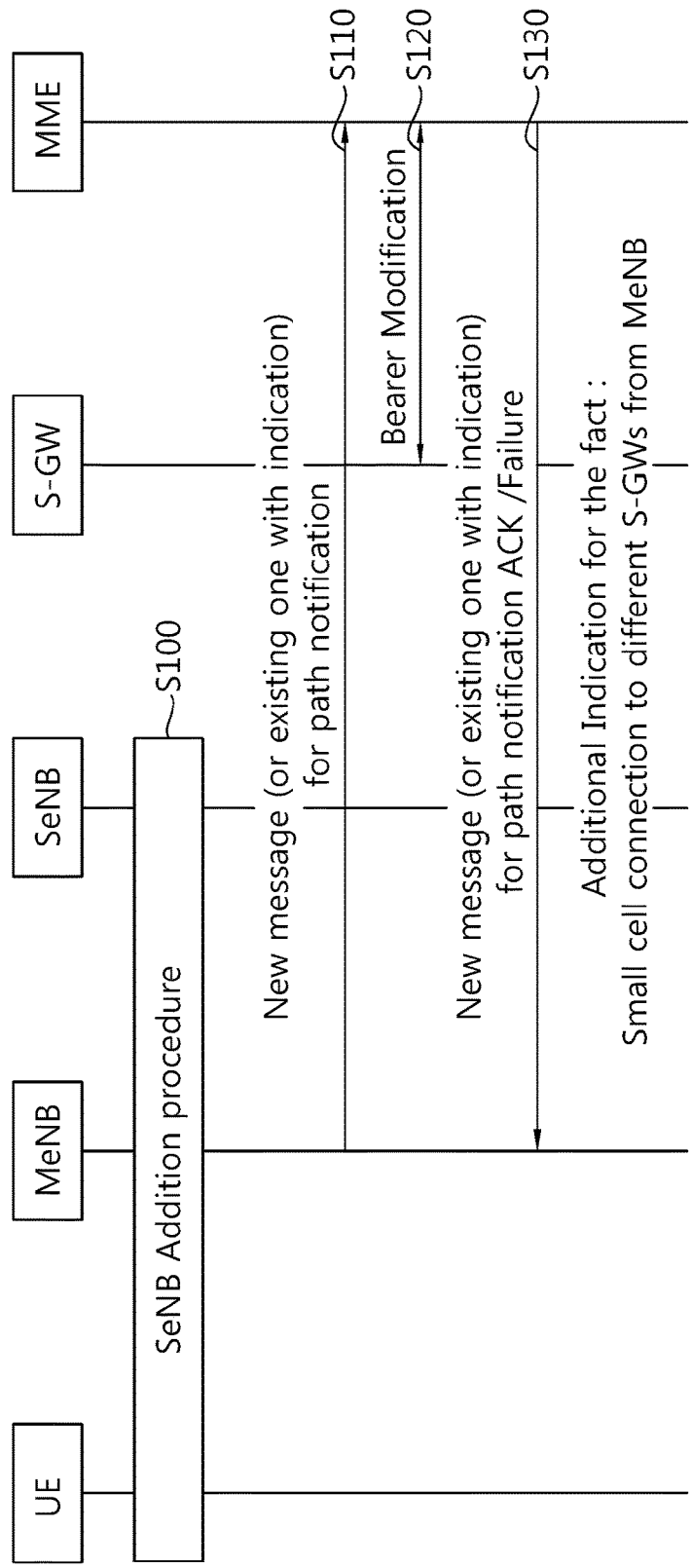
[Fig. 13]

[Fig. 14]
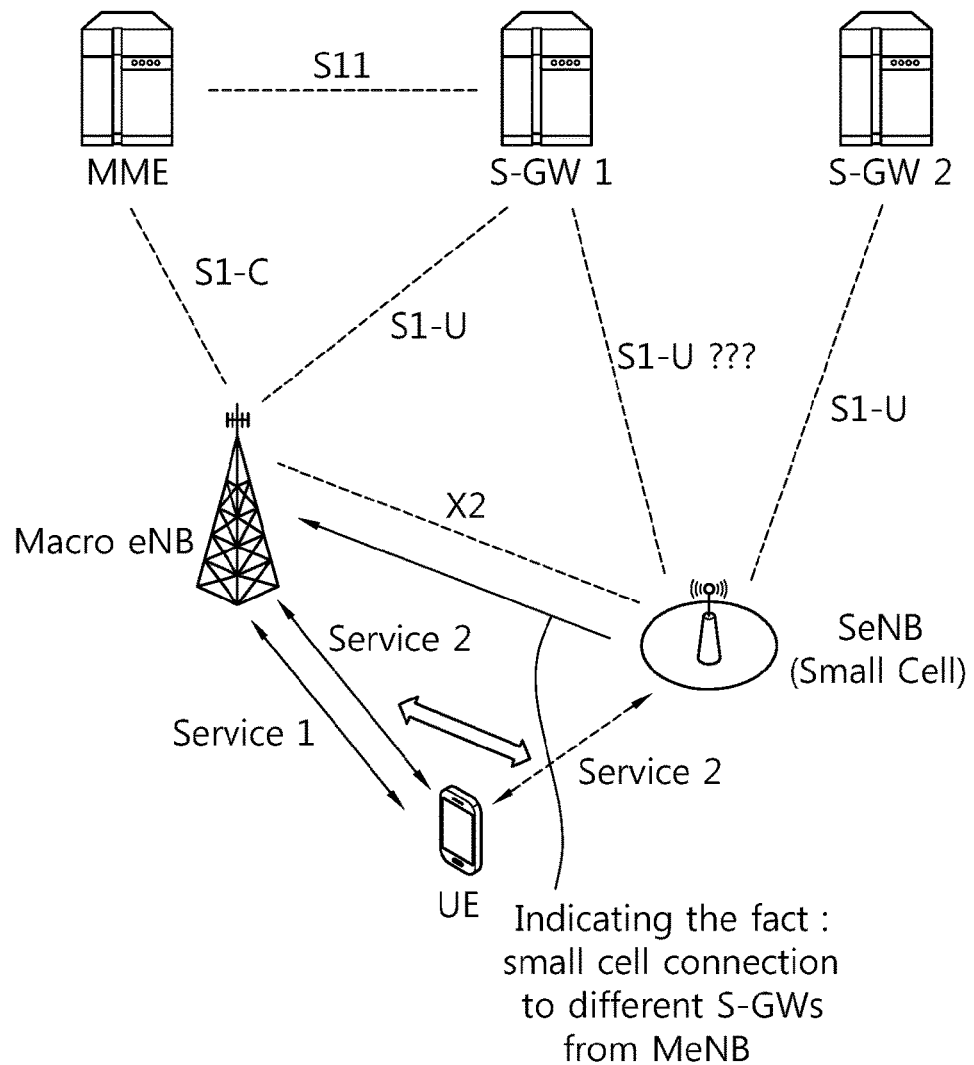

[Fig. 15]
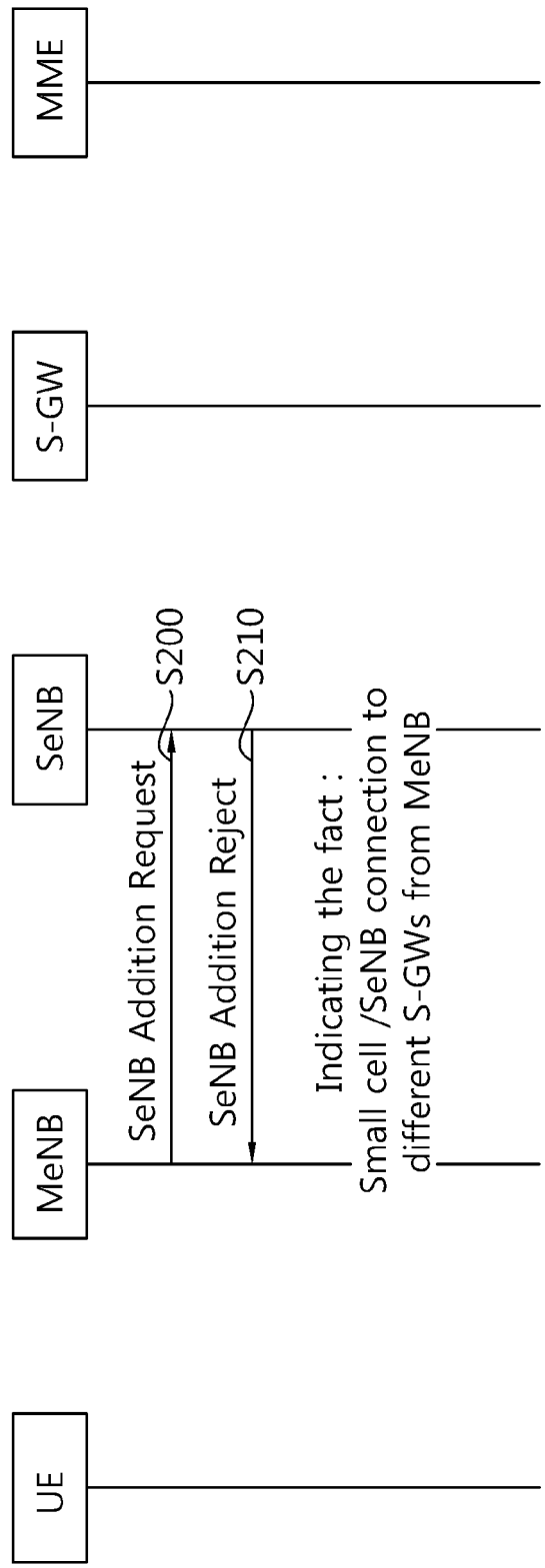

[Fig. 16]
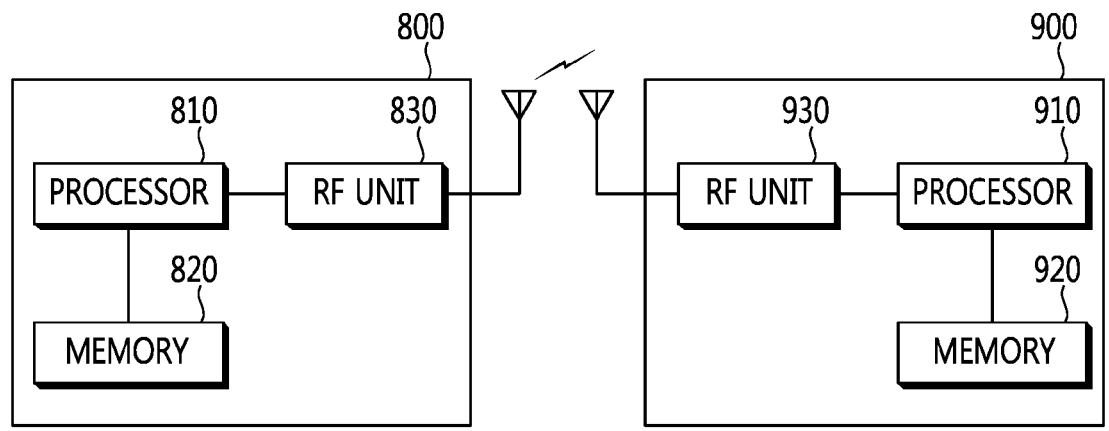

METHOD AND APPARATUS FOR TRANSMITTING INFORMATION ON SERVING GATEWAY FOR SUPPORTING SMALL CELL MOBILITY IN WIRELESS COMMUNICATION SYSTEM

CROSS REFERENCE TO RELATED APPLICATIONS

This application is the National Phase of PCT International Application No. PCT/KR2015/002679, filed on Mar. 19, 2015, which claims priority under 35 U.S.C. 119(e) to U.S. Provisional Application No. 61/955,769, filed on Mar. 19, 2014 and 62/052,474, filed on Sep. 19, 2014, all of which are hereby expressly incorporated by reference into the present application.

TECHNICAL FIELD

The present invention relates to wireless communications, and more particularly, to a method and apparatus for transmitting information on a serving gateway for supporting small cell mobility in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

According to a situation, different cells may be connected to different core network, which may cause failure of dual connectivity. In this case, a method for avoiding the failure of dual connectivity may be required.

DISCLOSURE OF INVENTION

Technical Problem

The present invention provides a method and apparatus for transmitting information on a serving gateway (S-GW) for supporting small cell mobility in a wireless communication system. The present invention provides a method for transmitting information on the S-GW, which indicates that a macro evolved NodeB (eNB) and a small cell eNB (SeNB) are connected to different S-GWs from each other.

Solution to Problem

In an aspect, a method for transmitting, by a mobility management entity (MME), information on a serving gateway (S-GW) in a wireless communication system is provided. The method includes receiving, by the MME, path notification information from a macro evolved NodeB (MeNB), and transmitting, by the MME, a failure message or an acknowledge message including a failure indication information element (IE) to the MeNB, if the MeNB and a small cell eNB (SeNB), which manages a small cell, are connected to different S-GWs from each other.

In another aspect, a method for transmitting, by a small cell evolved NodeB (SeNB) which manages a small cell, information on a serving gateway (S-GW) in a wireless communication system is provided. The method includes receiving, by the SeNB, a SeNB addition request message from a macro eNB, and transmitting, by the SeNB, an indication to the MeNB, if the MeNB and the SeNB are connected to different S-GWs from each other.

Advantageous Effects of Invention

If the MeNB and the SeNB are connected to different S-GWs from each other, failure of dual connectivity can be avoided by a simple try.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 7 shows inter-node radio resource aggregation for dual connectivity.

FIG. 8 shows an example of small cell enhancement architecture with dual connectivity.

FIG. 9 shows an example of architecture for dual connectivity.

FIG. 10 shows another example of architecture for dual connectivity.

FIG. 11 shows a possible problem of current architecture for dual connectivity.

FIG. 12 shows an example of a method for transmitting information on an S-GW according to an embodiment of the present invention.

FIG. 13 shows another example of a method for transmitting information on an S-GW according to an embodiment of the present invention.

FIG. 14 shows another example of a method for transmitting information on an S-GW according to an embodiment of the present invention.

FIG. 15 shows another example of a method for transmitting information on an S-GW according to an embodiment of the present invention.

FIG. 16 shows a wireless communication system to implement an embodiment of the present invention.

MODE FOR THE INVENTION

Figure 6:
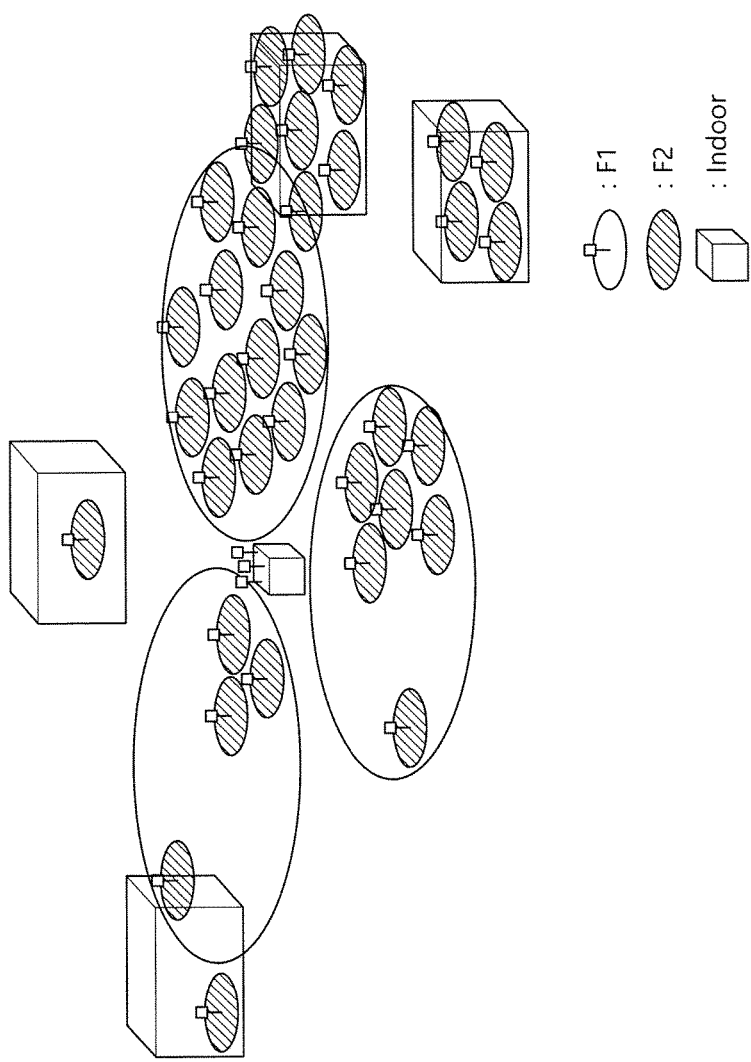
FIG. 6 shows deployment scenarios of small cells with/without macro coverage.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

FIG. 6 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered. Referring to FIG. 6, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
  where the UE is in coverage of both the macro cell and the small cell simultaneously
  where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs. For indoor UE, only low UE speed (0-3 km/h) is targeted. For outdoor, not only low UE speed, but also medium UE speed (up to 30 km/h and potentially higher speeds) is targeted. Both throughput and mobility/connectivity shall be used as performance metric for both low and medium mobility. Cell edge performance (e.g., 5%-tile cumulative distribution function (CDF) point for user throughput) and power efficiency (of both network and UE) are also used as metrics.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account. For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster. Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

FIG. 7 shows inter-node radio resource aggregation for dual connectivity. Referring to FIG. 7, inter-node radio resource aggregation is a potential solution for improving per-user throughput. This can be done by aggregating radio resources in more than one eNB for user plane data transmission. Depending on realization of this solution, signaling overhead towards the CN can potentially be saved by keeping the mobility anchor in the macro cell.

FIG. 8 shows an example of small cell enhancement architecture with dual connectivity. Referring to FIG. 8, the UE receives two kind of services by the dual connectivity. One of the services is received from the macro eNB (or, master eNB) directly. The other service is received from the small cell eNB (SeNB, or secondary eNB). Further, the service may be moved between the macro eNB and SeNB depending on the UE's requirement or load status of the eNBs. For supporting dual connectivity, two architectures may be provided.

FIG. 9 shows an example of architecture for dual connectivity. FIG. 9 shows the combination of S1-U that terminates in SeNB and independent PDCPs (no bearer split). The expected benefits of this alternative are:
  No need for MeNB to buffer or process packets for an evolved packet system (EPS) bearer transmitted by the SeNB;
  Little or no impact to PDCP/RLC and GPRS tunneling protocol (GTP)-U/user datagram protocol (UDP)/IP;
  No need to route all traffic to MeNB, low requirements on the backhaul link between MeNB and SeNB and no flow control needed between the two;
  Support of local break-out and content caching at SeNB straightforward for dual connectivity UEs.
The expected drawbacks of this alternative are:
  SeNB mobility visible to CN;
  Offloading needs to be performed by MME and cannot be very dynamic;
  Security impacts due to ciphering being required in both MeNB and SeNB;
  Utilization of radio resources across MeNB and SeNB for the same bearer not possible;
  For the bearers handled by SeNB, handover-like interruption at SeNB change with forwarding between SeNBs;
  In the uplink, logical channel prioritization impacts for the transmission of uplink data (radio resource allocation is restricted to the eNB where the Radio Bearer terminates).

FIG. 10 shows another example of architecture for dual connectivity. FIG. 10 shows the combination of S1-U that terminates in MeNB, bearer split in MeNB, and independent RLCs for split bearers. The expected benefits of this alternative are:
  SeNB mobility hidden to CN;
  No security impacts with ciphering being required in MeNB only;

No data forwarding between SeNBs required at SeNB change;
Offloads RLC processing of SeNB traffic from MeNB to SeNB;
Little or no impacts to RLC;
Utilization of radio resources across MeNB and SeNB for the same bearer possible;
Relaxed requirements for SeNB mobility (MeNB can be used in the meantime).

The expected drawbacks of this alternative are:
Need to route, process and buffer all dual connectivity traffic in MeNB;
PDCP to become responsible for routing PDCP PDUs towards eNBs for transmission and reordering them for reception;
Flow control required between MeNB and SeNB;
In the uplink, logical channel prioritization impacts for handling RLC retransmissions and RLC Status PDUs (restricted to the eNB where the corresponding RLC entity resides);
No support of local break-out and content caching at SeNB for dual connectivity UEs.

The corresponding UE architecture may be also changed to support the new feature related to dual connectivity.

FIG. 11 shows a possible problem of current architecture for dual connectivity. The MeNB, which is connected to the S-GW1 via S1-U interface, may initiate the SeNB addition procedure. However, the S-GW connected to the SeNB and MeNB may not be the same. One potential reason is that there may be a big number of SeNBs and the S1 connections for a specific S-GW may be limited. During the SeNB addition procedure, upon receiving path switch information, the MME checks whether the target SeNB connects to the same S-GW with the MeNB or not. If the SeNB is connected to the same S-GW with the MeNB, the SeNB addition procedure may be completed without problem. However, if the SeNB is not connected to the same S-GW with the MeNB, then the SeNB addition procedure may fail. This is because S-GW reallocation is not allowed currently and there is no way to know the exact failure reason based on the current scheme. Since the MeNB does not know that the SeNB is connected to the different S-GW, the MeNB may keep performing the SeNB addition procedure, and accordingly, failure may happen again and again.

In order to solve the problem described above, a method for avoiding the failure described above may be required. Hereinafter, a method for transmitting information on S-GW (s) according to an embodiment of the present invention. According to an embodiment of the present invention, the information on S-GW(s), which indicates that the SeNB is connected to the different S-GW from the MeNB, is notified to the MeNB. The information on S-GW(s) may be transmitted from the MME or SeNB, according to various embodiments of the present invention. Accordingly, the MeNB can avoid the SeNB addition procedure for the corresponding SeNB.

FIG. 12 shows an example of a method for transmitting information on an S-GW according to an embodiment of the present invention. Referring to FIG. 12, the MME transmits the information on the S-GW, which indicates that the SeNB is connected to the different S-GW from the MeNB, to the MeNB.

FIG. 13 shows another example of a method for transmitting information on an S-GW according to an embodiment of the present invention. For the sake of the convenience, only the SeNB addition procedure is described, but the SeNB modification/release/change procedure may be also performed.

In step S100, the SeNB addition procedure is performed among the UE, MeNB and SeNB. In step S110, the MeNB transmits the path notification information to the MME. The path notification information may include at least one of E-UTRAN radio access bearer (E-RAB) identifier (ID), transport layer address, tunnel endpoint ID (TEID). The path notification information may be transmitted via the existing path switch message with additional indication or via the newly defined message.

In step S120, if S-GW relocation is not needed, i.e. the MeNB and SeNB are connected to the same S-GW, the bearer modification procedure is performed between the MME and S-GW. The MME may transmit the path notification information acknowledge to the MeNB.

In step S130, if S-GW relocation is needed, i.e. the MeNB and SeNB are connected to the different S-GWs from each other, the MME makes a decision to reject the SeNB addition procedure, because S-GW relocation is not supported currently. In this case, the MME transmits the failure message to the MeNB. The failure message may include a cause value or additional indication, which indicates that requested S-GW is not possible. Or, the failure message may include a list of S-GWs connected to the corresponding SeNB. The failure message may be the existing message with indication or the newly defined message. Upon receiving the failure message, the MeNB may not try the SeNB addition procedure again towards the corresponding SeNB. Accordingly, the problem described above can be solved by a simple try.

FIG. 14 shows another example of a method for transmitting information on an S-GW according to an embodiment of the present invention. Referring to FIG. 14, the SeNB transmits the information on the S-GW, which indicates that the SeNB is connected to the different S-GW from the MeNB, to the MeNB.

FIG. 15 shows another example of a method for transmitting information on an S-GW according to an embodiment of the present invention. For the sake of the convenience, only the SeNB addition procedure is described, but the SeNB modification/release/change procedure may be also performed.

In step S200, the MeNB transmits the SeNB addition request message to the SeNB. The SeNB addition request message may include the transport layer address, i.e., the S-GW transport network layer (TNL) address of the UE, and GTP TEID, i.e., the UL GTP tunnel endpoint of the UE.

Upon receiving the SeNB addition request message, the SeNB compares the received S-GW TNL address of the UE with the TNL addresses of its own S-GW connections. If the received S-GW TNL address of the UE is found in the TNL addresses of its own S-GW connections, then the SeNB may accept the SeNB addition request, and keep performing the SeNB addition procedure.

If the SeNB cannot find the corresponding S-GW TNL address of the UE, i.e. the SeNB is not connected to the S-GW corresponding to the received S-GW TNL address of the UE, the SeNB transmits the indication, which indicates that the S-GW is not connected to the S-GW corresponding to the received S-GW TNL address of the UE, to the MeNB. The indication may be transmitted via the SeNB addition reject message. The SeNB addition reject message may include a cause value or additional information element (IE), which indicates that the SeNB has no connection with the requested S-GW. Or, the SeNB addition reject message may include a list of S-GWs connected to the corresponding SeNB. Alternatively, the indication may be transmitted via the newly defined message. Upon receiving the indication, the MeNB may not try the SeNB addition procedure again towards the corresponding SeNB. Accordingly, the problem described above can be solved by a simple try.

FIG. 16 shows a wireless communication system to implement an embodiment of the present invention.

A MeNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A SeNB or MME 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a mobility management entity (MME), information on a serving gateway (S-GW) in a wireless communication system, the method comprising:
   receiving, by the MME, path notification information from a macro evolved NodeB (MeNB); and
   transmitting, by the MME, a failure message or an acknowledge message including a failure indication information element (IE) to the MeNB, if the MeNB and a small cell eNB (SeNB), which manages a small cell, are connected to different S-GWs from each other.

2. The method of claim 1, wherein the failure message includes a cause value indicating that the MeNB and the SeNB are connected to different S-GWs from each other.

3. The method of claim 1, wherein the failure message includes an additional indication indicating that the MeNB and the SeNB are connected to different S-GWs from each other.

4. The method of claim 1, wherein the failure message includes a list of S-GWs connected to the SeNB.

5. The method of claim 1, wherein the failure message is transmitted via an existing message or a new message.

6. The method of claim 1, wherein the path notification information includes at least one of an evolved universal terrestrial radio access network (E-UTRAN) radio access bearer (E-RAB) identifier (ID), a transport layer address, or a tunnel endpoint ID (TEID).

7. The method of claim 1, wherein the path notification information is received via a path switch message or a new message.

8. A method for transmitting, by a small cell evolved NodeB (SeNB) which manages a small cell, information on a serving gateway (S-GW) in a wireless communication system, the method comprising:
   receiving, by the SeNB, a SeNB addition request message from a macro eNB (MeNB); and
   transmitting, by the SeNB, an indication to the MeNB, if the MeNB and the SeNB are connected to different S-GWs from each other,
   wherein the SeNB addition request message includes at least one of a S-GW transport network layer (TNL) address of a user equipment (UE) or an uplink (UL) general packet radio services (GPRS) tunneling protocol (GTP) tunnel endpoint of the UE, and
   wherein the indication corresponds to an information element (IE) indicating that the MeNB and the SeNB are connected to different S-GWs from each other.

9. The method of claim 8, wherein the indication corresponds to a cause value indicating that the MeNB and the SeNB are connected to different S-GWs from each other.

10. The method of claim 8, wherein the indication corresponds to a list of S-GWs connected to the SeNB.

11. The method of claim 8, wherein the indication is transmitted via a SeNB addition reject message or a new message.

12. The method of claim 8, wherein the S-GW TNL address of the UE does not correspond to an S-GW TNL address of the SeNB.

* * * * *